United States Patent Office 3,385,830
Patented May 28, 1968

3,385,830
PROCESS FOR MANUFACTURING POLYETHYLENE TEREPHTHALATE EMPLOYING METAL SALTS OF HALOGENATED ALIPHATIC ACIDS
Hans-Otto vom Orde and Paul-Friedrich Förster, Bobingen, near Augsburg, and Adolf Hartmann, Gessertshausen, Germany, assignors to Farbwerke Hoechst Aktiengesellschaft vormals Meister Lucius & Brüning, Frankfurt am Main, Germany, a corporation of Germany
No Drawing. Filed Mar. 4, 1965, Ser. No. 437,279
Claims priority, application Germany, Mar. 7, 1964,
F 42,233
3 Claims. (Cl. 260—75)

ABSTRACT OF THE DISCLOSURE

Production of polyethylene terephthalate by ester interchange of a dialkyl ester of terephthalic acid with ethylene glycol and polycondensing the resulting bis-[β-hydroxyethyl]-terephthalate employing as a catalyst at least one salt of an acid of the formula $$[CX_3(CX_2)_nCOO]_yMe$$

where each X is independently hydrogen or halogen, at least one being halogen, $n$ is a whole number from 0 to 6, $y$ is the valency of Me and Me is a metal of the group lithium, sodium, potassium, magnesium, calcium, barium, strontium, zinc, cadmium, mercury, tin, lead, manganese, cobalt or nickel.

---

High molecular weight, fiber- and film-forming polyethylene terephthalate, which is used as starting material for the manufacture of synthetic fibers and films, is prepared by first subjecting to an ester interchange reaction a dialkyl ester of terephthalic acid with ethylene glycol and then polycondensing the formed bis-[β-hydroxyethyl]-terephthalate with separation of ethylene glycol.

It is suitable to use catalysts in both reaction stages. As catalyst for the first stage, i.e. the ester interchange reaction of dialkyl terephthalate with an excess of ethylene glycol, the following compounds have been proposed: glycol-soluble carbonates, oxides, borates, alkoholates, oxalates or salts of readily volatile acids with bivalent metals, for example the acetates of magnesium, calcium, zinc, cadmium, lead, tin, cobalt, or manganese. Moreover, the lanthanum salts of readily volatile acids including lanthanum trifluoracetate constitute useful ester interchange catalysts.

Some of the aforesaid ester interchange catalysts have a certain activity in the second reaction stage, too, so that they may be used for the preparation of low molecular weight polyethylene terephthalate, the so-called precondensate.

As catalysts for the polycondensation there have become known, for example, the salts of the aforesaid metals with mineral acids and, above all, antimony trioxide.

It has likewise been proposed to use as catalysts in the ester interchange reaction as well as in the polycondensation organo-metal compounds of tin in which at least one carbon atom is bound to a bivalent or tetravalent tin atom.

The most important polycondensation catalyst used is, however, antimony trioxide. Although with the aid of suitable combinations of the aforesaid ester interchange catalysts and polycondensation catalysts a polyethylene terephthalate can be prepared which, with regard to its degree of polymerization, satisfies the demands on film- and fiber-forming polyesters, the use of said known catalysts involves a number of disadvantages. There must be mentioned, in the first place, coloration phenomena which occur often and which are done away with by adding to the polyester melt compounds of trivalent phosphorus, for example triphenyl phosphite. Moreover, undesirably large amounts of diethylene glycol are formed which detrimentally affect the physical properties of the linear polyethylene terephthalate. When antimony trioxide is used as polycondensation catalyst, it is disadvantageous that it is not sufficiently soluble in ethylene glycol. If a stoichiometric excess of acetate ester interchange catalysts is still present insoluble products and decomposition products are formed in the course of the polycondensation.

It has now been found that the known process for the manufacture of high molecular weight, fiber- and film-forming polyethylene terephthalate, in which dimethyl terephthalate is reacted with a 0.5 to 3 molar excess of glycol at a temperature in the range of from 170° C. to 230° C. and the bis-[β-hydroxyethyl]-terephthalate obtained is condensed by heating it under a reduced pressure in the range of from 35 to 0.1 millimeter of mercury at a temperature in the range of from 220° C. to 285° C. to obtain polyethylene terephthalate, can be improved by dissolving in the glycol used $3 \times 10^{-4}$ mol to $12 \times 10^{-4}$ mol, for one mol of dimethyl terephthalate used, of a salt of the general formula $$[CH_3(CH_2)_nCOO](Me)$$

in which $n$ is a whole number of 0 to 6, the hydrogen atoms are replaced partially or wholly by fluorine, chlorine, bromine or iodine and Me stands for a cationically bound metal of the group of lithium, sodium, potassium, magnesium, calcium, barium, strontium, zinc, cadmium, mercury, tin, lead, manganese, cobalt or nickel.

As halogencarboxylic acids there are preferably used the halogen derivatives of acetic acid, propionic acid, n-butyric acid, n-valeric acid, caproic acid, n-heptylic acid and caprylic acid, such as, for example, fluoroacetic acid, chloroacetic acid, bromoacetic acid, iodoacetic acid, dichloroacetic acid, trichloroacetic acid, α-chloropropionic acid and β-chloropropionic acid.

Especially favourable results are obtained with completely fluorinated products such as trifluoroacetic acid, pentafluoropropionic acid, perfluoro-n-valeric acid, perfluorocaproic acid, perfluoro-n-heptylic acid and perfluorocaprylic acid.

The following mixtures of salts are distinguished by a particularly high effect: manganese (II)-trifluoroacetate trihydrate, magnesium-trifluoroacetate tetrahydrate, calcium-trifluoroacetate monohydrate, barium-n-perfluorobutyrate monohydrate, tin (II)-n-perfluorobutyrate monohydrate, calcium-n-perfluorobutyrate monohydrate, tin (II)-n-perfluorocaprylate, and zinc-n-perfluorocaprylate dihydrate. In most cases mixtures of 2 or 3 of the aforesaid salts are used. It is likewise possible to use mixtures of more than 3 compounds.

It is advantageous to perform the polycondensation in two stages. In the first stage the temperature of the mixture of bis-[β-hydroxyethyl]-terephthalate and ethylene glycol obtained after the ester interchange reaction is raised in about 1 hour from 220° C. to 280° C., while the pressure is simultaneously reduced to about 0.8 mm. of mercury. The precondensate thus obtained in 1 hour which is free from the excess of ethylene glycol, is transferred into a connected reaction vessel in which the condensation is completed under a pressure of about 0.2 mm. of mercury.

The catalysts to be used according to the invention offer the great advantage that the necessary amounts are readily soluble in ethylene glycol at low temperatures of up to 60° C. Owing to the chemical and thermal stability of the metal salts of halogenocarboxylic acids the two stages of the ester interchange reaction and the polycondensation can be carried without the addition of a further amount of catalyst being necessary.

The polyethylene terephthalate prepared according to the process of the invention has a high intrinsic viscosity $\eta$, which is measured at 25° C. with solutions of 1 gram of polycondensation product in 100 milliliters of a mixture of 60 parts of phenol and 40 parts of tetrachloroethane. The polyethylene terephthalate is excellently suitable for the manufacture of shaped structures such as fibers, filaments, or foils. The softening points of the polyethylene terephthalates prepared by the process of the invention are as high as the softening points of products prepared with the use of antimony-containing catalysts. The molten polyethylene terephthalates prepared according to the process of the invention have a very low content of diethylene glycol. After hydrolytic degradation of melt samples the contents of diethylene glycol found by gaschromatographic determination were in the range of from 0.33 to 0.91%.

The metal salts of halogencarboxylic acids to be used as catalysts according to the invention are prepared in known manner, for example by reacting halogenated acids with neutral or basic carbonates of sodium, potassium, magnesium, calcium, barium, zinc, lead, manganese, or other bivalent metals. The stannous salts of the perfluorinated carboxylic acids are advantageously prepared in a manner such that an excess of perfluorocarboxylic acid, which may be diluted with hexane, is allowed to act on tin foil at moderately elevated temperature, the crude salts obtained are purified by recrystallization or reprecipitation, and the purified salt is dried.

The following examples serve to illustrate the invention but they are not intended to limit it thereto.

Example 1

(a) 194.19 grams (1 mol) of dimethyl terephthalate (melting point 140.1° C.) and 152.06 grams (2.45 mols) of ethylene glycol, which was free of water, contained 0.1% of diethylene glycol and had a refractive index $n_D^{20°}$ of 1.4318, were subjected to an ester interchange reaction. As catalyst a solution of 0.2907 gram ($5 \times 10^{-4}$ mol) of barium-n-perfluorobutyrate monohydrate and 0.067 gram ($2 \times 10^{-4}$ mol) of manganese (II)-trifluoroacetate trihydrate in 3.1 grams (0.05 mol) of ethylene glycol was added. The ester interchange reaction was performed in a distillation device of apparatus glass with a ratio of reflux of 8–10 to 1. The heating temperature was raised from 180° C. to 225° C. With the separation of methanol the reaction was terminated after 165 minutes. Besides the calculated amount of methanol 1.3% by volume of ethylene glycol were found in the distillate.

(b) One half of the reaction mixture obtained, consisting of 127.1 grams of bis-[β-hydroxyethyl]-terephthalate, 15 grams of ethylene glycol and the catalyst was transferred with the aid of a pump into a pear-shaped reaction vessel of apparatus glass heated at 220° C. In the reaction vessel a cylindrical insert was provided for in which an agitator with angular blades rotated and provoked a downward movement of the reaction mixture (67 revolutions per minute). The temperature was raised from 220° C. to 280° C. in one hour while the pressure was gradually reduced from 35 to 0.8 mm. of mercury. These reaction conditions were maintained constant for a further hour, while a precondensation product was formed with the separation of ethylene glycol. With the aid of a gear pump the melt was then transferred into a second heated reaction vessel of same shape in which a reduced pressure of 0.1 to 0.2 mm. of mercury was maintained and the insert was by 50% shorter. In the course of 30 minutes an average temperature of 281.2° C. was adjusted and the pressure was reduced from 0.7 to 0.2 mm. of mercury. The reaction mixture was continuously stirred with 67 revolutions per minute. After 120 minutes it had an intrinsic viscosity $\eta$ of 0.647, after 150 minutes of 0.681 and after 180 minutes of 0.701.

The melt obtained was clear as water and well suitable for being processed into shaped structures. After having removed the reaction mixture from the vessel and chilled, the yield amounted to 92.5 grams with a content of diethylene glycol of 0.44%. The reaction product obtained had a softening point of 259.7° C. 44 grams of ethylene glycol in admixture with 3.0 grams of bis-[β-hydroxyethyl]-terephthalate could be recovered.

Example 2

The same amounts of dimethyl terephthalate and ethylene glycol as in Example 1 were reacted as described in said example, however with the addition of a solution of 0.2907 gram ($5 \times 10^{-4}$ mol) of barium-n-perfluorbutyrate monohydrate in 3.1 grams of ethylene glycol. The periods of time required were 190 minutes for the ester interchange reaction, 120 minutes for the precondensation inclusive of the heating period, and 180 minutes of the polycondensation, which was performed at an average temperature of 280.4° C. and under a pressure of 0.2 mm. of mercury. The polyethylene terephthalate obtained had an intrinsic viscosity $\eta$ of 0.623.

Example 3

The same amounts of the starting materials as used in Examples 1 and 2 were reacted as described in the said examples with the addition of 0.235 gram ($7 \times 10^{-4}$ mol) of manganese (II)-trifluoroacetate trihydrate. The periods of time required were: 180 minutes for the ester interchange reaction, 120 minutes for the first polycondensation stage and 180 minutes for the second polycondensation stage carried out at an average temperature of 280.1° C. The polyethylene terephthalate obtained had an intrinsic viscosity $\eta$ of 0.631 and a softening point of 259.2° C.

Example 4

The same amounts of dimethyl terephthalate and ethylene glycol as used in Example 1 were reacted as described in said example with the use of a mixture of 0.1688 gram ($3 \times 10^{-4}$ mol) of tin (II)-n-perfluorobutyrate monohydrate and 0.189 gram ($2 \times 10^{-4}$ mol) of tin (II)-n-perfluorocaprylate as catalyst. At a temperature of 180° C. the methanol distillation started after 32 minutes, it was then terminated after 160 minutes while the temperature was raised to 225° C.

As described in Example 1(b) the two polycondensation stages were carried out with one half of the reaction mixture obtained. The residence time in either stage was 120 minutes and the average temperature in the final stage was 279.5° C. The chilled melt had a weight of 93 grams, an intrinsic viscosity $\eta$ of 0.836, a softening point of 258.1° C. and a content of diethylene glycol of 0.91%. The polyethylene terephthalate obtained was especially suitable for the manufacture of fibers and foils.

Example 5

The same amounts of dimethyl terephthalate and ethylene glycol as in Example 1 were reacted as described in said example with the use of 0.3376 gram ($6 \times 10^{-4}$ mol) of tin (II)-n-perfluorobutyrate monohydrate. The residence time was 185 minutes in the ester interchange reaction and 120 minutes each in the two polycondensation stages, while the average temperature in the final stage was adjusted to 278.9° C. The polyethylene terephthalate obtained had in intrinsic viscosity $\eta$ of 0.683 and was well suitable for the manufacture of shaped structures.

Example 6

The same amounts of dimethyl terephthalate and ethylene glycol as in Example 1 were reacted as described in the said example with the use of a mixture of 0.1269 gram ($3 \times 10^{-4}$ mol) of magnesium-trifluoroacetate monohydrate, 0.0568 gram ($2 \times 10^{-4}$ mol) of calcium-trifluoroacetate monohydrate and 0.0581 gram ($1 \times 10^{-4}$ mol) of barium - n - perfluorobutyrate monohydrate as catalyst. After a starting period of 18 minutes the duration of reaction in the ester interchange was 140 minutes. As distillate the calculated amount of methanol was obtained containing 1.5% by volume of ethylene glycol.

One half of the mixture obtained was subjected to polycondensation. The residence time in the first stage was 120 minutes and in the second stage 150 minutes. The final condensation was carried out at an average temperature of 281.7° C. and under a pressure of 0.2 mm. of mercury. 93 grams of a water-white melt of of polyethylene terephthalate were obtained having an intrinsic viscosity $\eta$ of 0.670, a softening point of 261.1° C. and a content of diethylene glycol of 0.33%.

Example 7

The same amounts of dimethyl terephthalate and ethylene glycol as in Example 1 were reacted as described in said example, however with the use of a mixture of 0.1937 gram ($4 \times 10^{-4}$ mol) of calcium-n-perfluorobutyrate monohydrate and 0.0913 gram ($3 \times 10^{-4}$ mol) of magnesium-trifluoroacetate trihydrate as catalyst. After a starting time of 25 minutes the duration of reaction of the ester interchange was 150 minutes. After having carried out the two polycondensation stages, each of which took 180 minutes, at a temperature of the final stage of 281.6° C., a colorless polyethylene terephthalate was obtained having an intrinsic viscosity $\eta$ of 0.660, a softening point of 258.9° C. and a content of diethylene glycol of 0.39%.

We claim:

1. In a process for the manufacture of high molecular weight, fiber- and film-forming polyethylene terephthalate by subjecting dimethyl terephthalate to an ester interchange reaction with a 0.5 to 3 molar excess of glycol at a temperature in the range of from 170° C. to 230° C. and condensing the formed bis-[β-hydroxyethyl]-terephthalate by heating it under a reduced pressure in the range of from 35 to 0.1 millimeter of mercury at a temperature in the range of from 220° C. to 285° C., the improvement of dissolving in the glycol used for the ester interchange reaction $3 \times 10^{-4}$ to $12 \times 10^{-4}$ mol, for one mol of dimethyl terephthalate used, of a salt of the general formula $$[CX_3(CX_2)_nCOO]_yMe$$

wherein each X is independently a member selected from the group consisting of hydrogen and halogen selected from the group consisting of fluorine, chlorine, bromine and iodine, at least one of X being halogen, $y$ is an integer corresponding to the valency of Me, $n$ is a whole number of 0 to 6, and Me is a metal selected from the group consisting of lithium, sodium, potassium, magnesium, calcium, barium, strontium, zinc, cadmium, mercury, tin, lead, manganese, cobalt and nickel and conducting the ester interchange and condensation reactions.

2. The process according to claim 1 wherein the salt is of an acid selected from the group consisting of perfluorinated acetic acid, perfluorinated propionic acid, perfluorinated n-butyric acid, perfluorinated n-valeric acid, perfluorinated caproic acid, perfluorinated n-heptylic acid and perfluorinated caprylic acid with a metal selected from the group consisting of lithium, sodium, potassium, magnesium, calcium, barium, strontium, zinc, cadmium, mercury, tin, lead, manganese, cobalt and nickel.

3. The process according to claim 1 wherein as the salt there is employed a mixture of 2 to 3 salts selected from the group consisting of manganese (II)-trifluoroacetate trihydrate, magnesium-trifluoroacetate tetrahydrate, calcium-trifluoroacetate monohydrate, barium-n-perfluorobutyrate monohydrate, tin (II)-n-perfluorobutyrate monohydrate, calcium-n-perfluorobutyrate monohydrate, tin (II)-n-perfluorocaprylate and zinc-n-perfluorocaprylate dihydrate, the total amount of dissolved salts being in the range of from $3 \times 10^{-4}$ mol to $12 \times 10^{-4}$ mol, for one mol of dimethyl terephthalate used.

References Cited

UNITED STATES PATENTS

| | | | |
|---|---|---|---|
| 2,249,950 | 7/1941 | Fuller | 260—75 |
| 2,820,023 | 1/1958 | Canvanaugh et al. | 260—75 |
| 3,110,547 | 11/1963 | Emmert | 260—75 |

WILLIAM H. SHORT, *Primary Examiner.*

LOUISE P. QUAST, *Examiner.*